(12) United States Patent
Lindh

(10) Patent No.: US 8,714,277 B2
(45) Date of Patent: May 6, 2014

(54) TOOL FOR ENGAGEMENT IN THE GROUND

(75) Inventor: Hans Lindh, Stockholm (SE)

(73) Assignee: Hesselman & Lindh AB, Stockholm (SE)

( * ) Notice: Subject to any disclaimer, the term of this patent is extended or adjusted under 35 U.S.C. 154(b) by 0 days.

(21) Appl. No.: 13/255,604

(22) PCT Filed: Mar. 10, 2010

(86) PCT No.: PCT/SE2010/000051
§ 371 (c)(1),
(2), (4) Date: Oct. 5, 2011

(87) PCT Pub. No.: WO2010/104443
PCT Pub. Date: Sep. 16, 2010

(65) Prior Publication Data
US 2012/0040779 A1 Feb. 16, 2012

Related U.S. Application Data

(60) Provisional application No. 61/176,188, filed on May 7, 2009.

(30) Foreign Application Priority Data

Mar. 11, 2009 (SE) ........................................ 0900314

(51) Int. Cl.
*A01B 1/00* (2006.01)
(52) U.S. Cl.
USPC .................................. 172/378; 172/25
(58) Field of Classification Search
USPC .............................. 172/371, 378, 25
See application file for complete search history.

(56) References Cited

U.S. PATENT DOCUMENTS

| | | | | | |
|---|---|---|---|---|---|
| 1,647,832 | A | * | 11/1927 | Kovar | 294/50.5 |
| 1,672,095 | A | | 6/1928 | Schacht | |
| 2,030,770 | A | | 2/1936 | Smith | |
| 2,082,476 | A | * | 6/1937 | Allen | 172/25 |
| 3,443,830 | A | * | 5/1969 | Jones | 294/50.7 |
| 3,554,293 | A | * | 1/1971 | Aman et al. | 172/13 |
| 3,847,227 | A | | 11/1974 | Myers | |
| 4,049,059 | A | * | 9/1977 | Weibling | 172/15 |
| 4,603,744 | A | * | 8/1986 | Ramirez | 172/25 |

(Continued)

FOREIGN PATENT DOCUMENTS

| | | |
|---|---|---|
| GB | 800480 A | 8/1958 |
| JP | 2003-74281 A | 3/2003 |
| WO | WO 2008/073896 A2 | 6/2008 |

*Primary Examiner* — Jamie L McGowan
(74) *Attorney, Agent, or Firm* — Dickstein Shapiro LLP

(57) ABSTRACT

Tool (1) for engagement in the ground including a holding portion (9) for turning of the tool around an axis of rotation (3), wherein an engagement portion (2) has a plurality of cutting blades (4) extending in directions from the holding portion (9) and being distributed around the axis of rotation (3) for pressing down into and engagement with the ground, said cutting blades each having a proximal end (5) and a distal free end (6). The cutting blades (4) have a respective front edge (7), for cutting action against the ground and a respective rear edge (8), wherein points on the front edges (7) are positioned at a greater distance from the axis of rotation (3) than points on the rear edges (8), and the cutting blades (4) are angled such that a distal portion of each rear edge is positioned in front of as seen in the turning direction (v), and essentially at the same distance from the axis of rotation (3) as a proximal portion thereof.

14 Claims, 2 Drawing Sheets

(56) References Cited

U.S. PATENT DOCUMENTS

| | | | |
|---|---|---|---|
| 4,641,712 A * | 2/1987 | Cravotta | 172/25 |
| 4,905,768 A * | 3/1990 | Lorenz | 172/25 |
| 4,951,951 A * | 8/1990 | Meyer | 473/286 |
| 5,338,078 A | 8/1994 | Basek | |
| D406,219 S * | 3/1999 | Basek | D8/13 |
| 6,517,445 B1 * | 2/2003 | O'Neill | 473/226 |
| 6,843,324 B2 * | 1/2005 | Basek | 172/378 |
| 7,314,095 B2 | 1/2008 | Cobb | |
| 7,347,276 B2 * | 3/2008 | Basek | 172/25 |
| D579,738 S * | 11/2008 | Karczewski | D8/7 |
| 7,748,470 B2 * | 7/2010 | Ortiz | 172/13 |
| 8,201,639 B2 * | 6/2012 | Szurpicki | 172/380 |
| 2006/0070751 A1 | 4/2006 | Cobb | |
| 2006/0070756 A1 * | 4/2006 | Basek | 172/378 |
| 2008/0051227 A1 | 2/2008 | Otsubo | |
| 2008/0135267 A1 * | 6/2008 | Karczewski | 172/378 |

\* cited by examiner

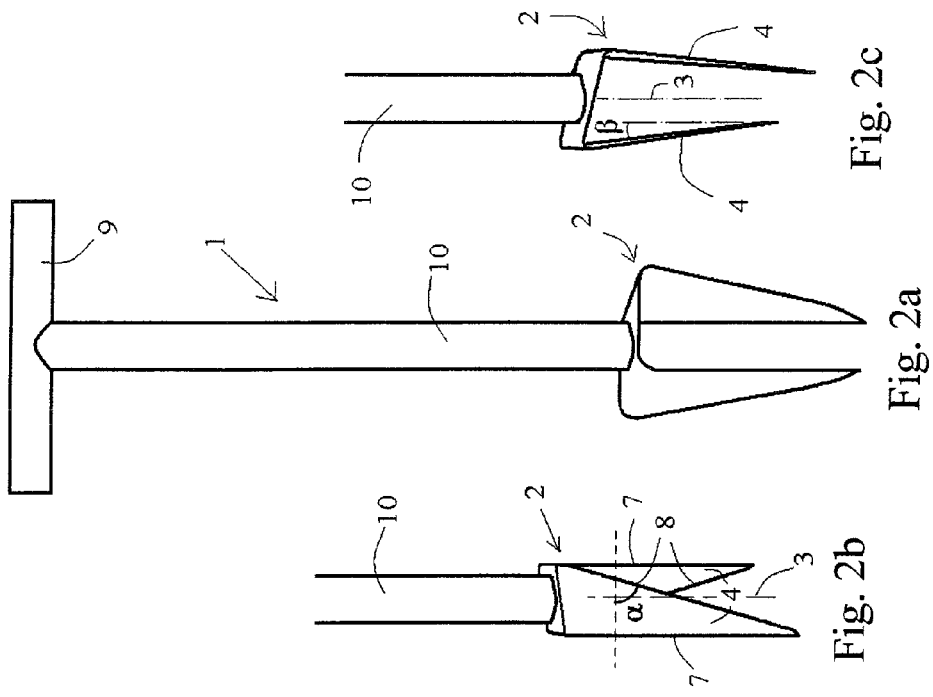
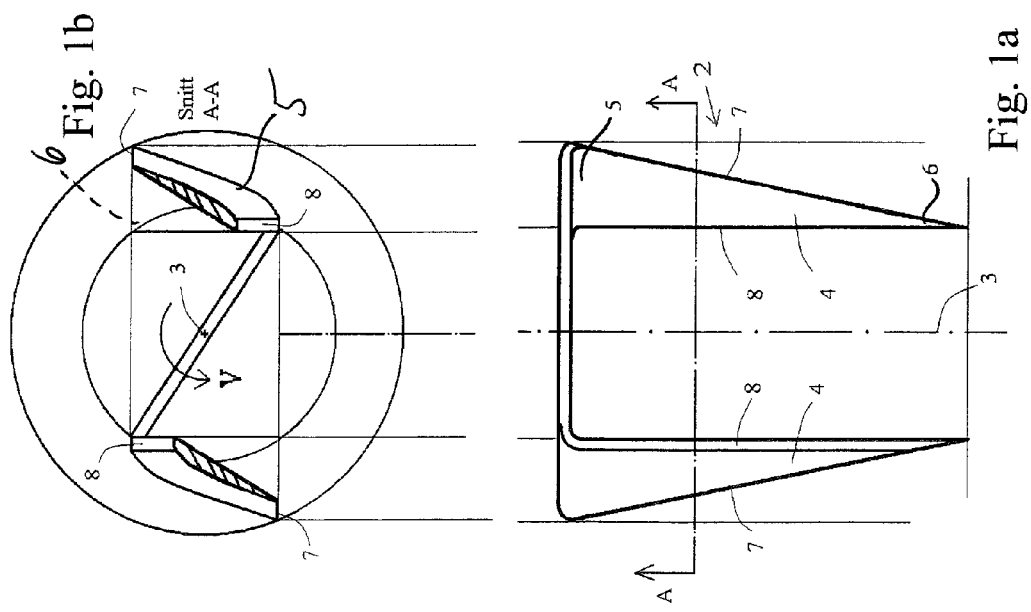

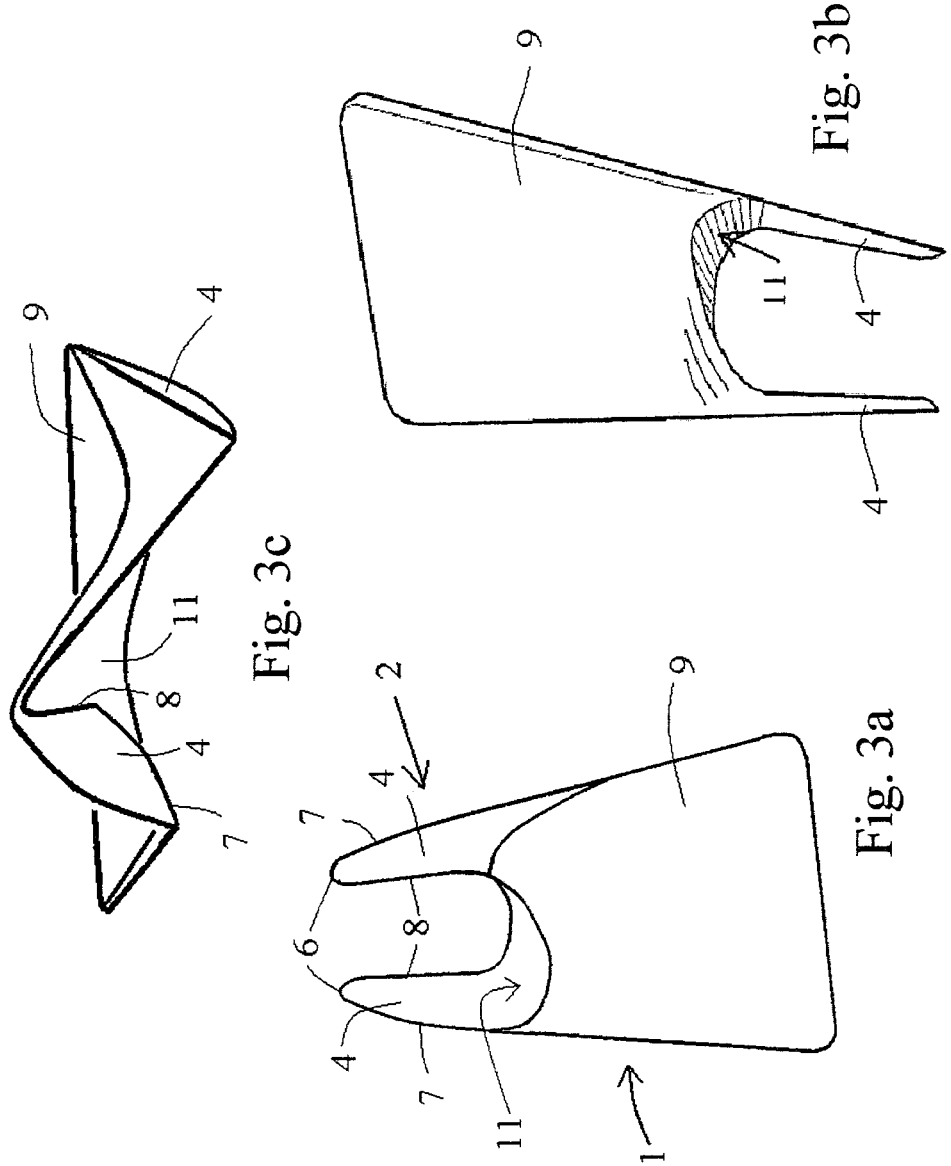

TOOL FOR ENGAGEMENT IN THE GROUND

FIELD OF THE INVENTION

The invention relates to a tool for engagement in the ground including a holding portion for maneuvering an engagement portion during turning of the tool around an axis of rotation extending through the holding portion and the engagement portion, wherein the engagement portion has a plurality of cutting blades extending in directions from the holding portion and being distributed around the axis of rotation for pressing down into and engagement with the ground, said cutting blades each having a proximal end closes to the holding portion and a distal free end, at the greatest distance from the holding portion.

BACKGROUND OF THE INVENTION

From U.S. Pat. No. 2,030,770, such a tool is previously known in the form of un uprooting device, which comprises a shank having two separate cutting blades and a handle for pressing down and turning the cutting blades such that a free-cut weed root can be extracted. An ejector is arranged to push out the extracted root.

From US 2008/0051227 A1 is further previously known a tool for the repair of divots on golf greens, a so called golf green repair tool, wherein two parallel blades extend from a handle portion, said blades being intended to be brought down into the ground, close to the divot, and there, by a tilting action, bring turf and grass roots to the area of the divot.

The previously known devices have a number of disadvantages whereof i.a. can be mentioned problems with secure pull-out of a free-cut root from the formed hole, in the case of an up-rooting device, and requirements for repeated manipulations around a divot in the case of a golf green repair tool. In the latter case there is also a considerable risk of erroneous manipulation of the green repair tool, such that the grass is damaged instead of the divot being repaired.

AIM AND MOST IMPORTANT FEATURES OF THE INVENTION

It is an aim with the invention to provide a tool, wherein the problems with the previously known devices are addressed and at least reduced.

This is achieved according to the invention in a device of the kind mentioned initially through the features of the characterizing portion of claim 1. Hereby is achieved that rotating of an engagement portion which is brought down into the ground results in, on the one hand an inward moving action to the influenced material towards a centre of rotation, on the other hand an upwardly moving action of the material towards the ground surface.

Through the feature that the cutting blades are angled such that a distal portion of the respective rear edge is positioned in front of, as seen in the turning direction, and essentially at the same distance from a axis of rotation as a proximal portion thereof, it is achieved, in combination with the positioning of the front edge and the rear edge of the cutting blades in respect of the axis of rotation, in practice that the cutting blades are angled inwardly as seen over their length from their proximal to their distal ends.

During pressing down of the engagement portion into the ground, the tool is automatically guided such that turning in the turning direction occurs, because of the slanted path of the rear edge, and thereby initiating of a cutting action, at the same time as moving material inwards. During continued rotation, at a constant level, an upward moving action is achieved besides continued inward moving action onto influenced material. These effects can, however, overlap depending on the design of the cutting blades.

In case the tool is an uprooting device, combined inward and upward moving action during rotation facilitates that the free-cut root in fact really follows the tool up from the hole.

In a case where the tool is a golf green repair tool, because of this combined inward and upward moving action during rotation, it is achieved that material is brought inward towards the centre of the divot to be repaired, and, which is essential for the invention, because of the angles of the cutting blades, that an uplifting action of material and fresh grass roots is achieved as a complement to said inward moving action, which facilitate effective restoring of a divot on a golf green through a limited, very quick action by the user.

By, in a variant of the invention, the front edge having an evenly extending forward bend, and in particular that the cutting blades have arched cross-section, particular advantageous inward movement and uplifting of the influenced material is achieved in use of the tool.

By, in an other variant, the engagement portion adjacent to the proximal ends of the cutting blades have a levelling surface portion positioned between them, rounded, inwardly extending towards the axis of rotation, it is achieved that by turning the tool, material that has been brought inwardly and been lifted is leveled and flattened to a level of the ground surface.

In the tool according to the invention it is suitable that the ratio between the distance between points positioned on the front edge and the axis of rotation and the distance between points positioned on the rear edge and the axis of rotation is from about 5/4 to about 2/1 as seen in a section centrally between the proximal and distal ends of the cutting blades.

When the tool is a divot repair tool for golf greens, it is suitable that the distance between the distal end of a cutting blade and the axis of rotation is about 6-11 mm and the length of the cutting blades is about 15-30 mm, which gives good adaptation to the size of a normal divot.

By, as a further variant, the cutting blades further are angled between about 5° and 15° in relation to the axis of rotation, it is achieved that the tool is simple to handle and to keep, for example in a users pocket, wherein it is preferred that the tool is essentially plate-shaped with angled cutting blades.

The tool according to the invention is in one embodiment also advantageous for extracting weed roots, wherein the distance between the distal end of a cutting blade and the axis of rotation is suitably about 6-15 mm and the length of the cutting blades is about 50-80 mm. This is in respect of uprooters for weeds having the roots relatively close to the surface of the ground. In alternative embodiments for the tool as uprooters for weeds with longer roots, the cutting blades can be as long as 200 mm or even longer than that, whereas 50-180 mm, however, being practical for normal gardening use. In such cases, the distance between the distal end of a cutting blade and the axis of rotation can be about 6-30 mm whereas 6-25 mm, however, being practical for normal gardening use.

In a further, preferred embodiment, the tool exhibits a holding portion in the form of a handle being position transverse to the axis of rotation, and in particular connects to the holding portion a preferably tubular intermediate portion, which passes over to the engagement portion, whereby it is achieved that the tool can be handled by a standing user for repairing greens as well as for uprooting weeds.

It is suitable that the cutting blades are angled between 1° and 12° in respect of the axis of rotation in case the tool is an uprooter.

Further advantages and features of the invention will be evident from the other claims and the following description of embodiments.

BRIEF DESCRIPTION OF DRAWINGS

The invention will now be described in greater detail by way of embodiments and with reference to the annexed drawings, wherein:

FIGS. 1a and 1b show an engagement portion for a tool according to the invention in a side view and a sectional view respectively, FIG. 2a shows a tool according to the invention in a first perspective view, and FIGS. 2b and 2c respectively show the tool in FIG. 2a in two further perspective views, FIGS. 3a-3c show a further embodiment of a tool according to invention in three different views.

DESCRIPTION OF EMBODIMENTS

FIG. 1a shows an engagement portion 2 of a tool according to the invention, wherein a holding portion (positioned above the engagement portion 2 in the Figure) of the tool is not shown. The engagement portion 2 includes two cutting blades 4, which are positioned evenly distributed around an axis of rotation 3 of the tool, wherein each cutting blade 4 has a proximal end 5 closest to the (here not shown) holding portion and a distal end 6 being a free end of the respective cutting blade 4.

Each cutting blade 4 has a front edge 7 with a cutting edge for cutting into the ground when using the tool. Further, each cutting blade 4 has a rear edge 8, wherein "front" and "rear" refer to the rotational direction v, as is indicated in FIG. 1b. As is also evident from FIG. 1b, points on the front edges 7 are positioned at a greater distance from the axis of rotation 3 than points on the rear edges 8. This is over the entire extension of each blade 4 from the proximal end 5, being closest to the holding portion, to the distal end 6. This means that during turning of the tool in the rotational direction v, the cutting blades will sweep an area and thereby exercise an inward pressing action, towards the axis of rotation 3, onto material which is positioned in an area which is swept by the respective cutting blade 4. Here is shown also the cutting blade 4 with an arch-shaped cross-section.

Further, the cutting blades 4 are angled in respect of the axis of rotation in such a way that a distal portion of the respective rear edge 8 is positioned in front of, as seen in the rotational direction and also essentially at the same distance from the axis of rotation as a proximal portion of said rear edge. Hereby is achieved that the cutting blades 4 are somewhat angled inwardly toward the axis of rotation 3 and that influenced material during use of the tool during turning of the same besides said inward pressing action also will experience an upward directed lifting action. By the distal portion of the respective rear edge 8 being positioned essentially at the same distance from the axis of rotation as a proximal portion of said rear edge, and preferably exactly at the same distance, it is achieved that during pressing down of the engagement portion 2 into the ground, no significant influence will occur of the material concerned in any undesired direction, such as downwardly into the ground, which would otherwise be the case with differently angled cutting blades. In FIG. 1a this arrangement is shown of the cutting blades through the parallel lines representing the rear edges 8 in the view at hand, and in FIG. 1b in that both the distal portion of the cutting blades (indicated with interrupted reference line at 6) and the proximal portion of the respective rear edge will be positioned radially in level with the inner circle.

This effect is advantageous in respect of golf green repair tools as well as uprooters and possibly other types of tools for engagement with the ground which are intended by the invention, for example hole making tools.

The concentric circles being shown in connection with FIG. 1b, define a sweep area of the cutting blades during turning of the tool on the level of the proximal ends of the cutting blade. The sweep area will be successively smaller at levels in the direction of the distal ends of the cutting blades.

FIG. 2a shows a tool 1 with an engagement portion 2 of essentially the same kind as is shown in FIG. 1a, but with a holding portion 9 including a transverse handle 9 as seen in respect of the axis of rotation 3. Between the holding portion 9 and the engagement portion 2 there is positioned an intermediate portion 10 being comprised of a tubular distance portion, which allows a user to manoeuvre the engagement portion 2, e.g. standing.

FIGS. 2b and 2c show the tool 1 according to FIG. 2a in further perspective views, wherein the positions of the cutting blades are clarified. A great advantage with the tool according to this embodiment being an uprooter, is that it is easy to release an extracted root from it's position between the cutting blades by simply striking the tool with a root between the cutting blades against an object such as a shoe, in a direction at a right angle to the plane of the paper, as seen in FIG. 2c. No ejector is thus necessary. Here is also shown that the cutting blades 4 are angled an angle β in respect of the axis of rotation 3. The angle β suitably is between 1° and 12° depending on the type of tool.

The angle α between the rear edge 8 and an imagined horizontal plane, transverse to the axis of rotation, is shown here and is suitably about 60°-80° depending on the type of tool. Other values can come into question.

A problem when repairing divots on golf greens with previously known divot repair tools, is that it is easy for the user to use the tool erroneously, such that the damages is made worse instead of being attended to. The fact is that it has been shown that the usual uplifting movement performed with conventional repair tools impairs the conditions for the grass to quickly regain its growth into the place of the divot.

FIGS. 3a to 3c show in different views the construction of a tool according to the invention, in the form of a golf green repair tool for keeping by a golf player and for using for repair of divots on golf greens.

The holding portion 9 is here shown plate-shaped and the cutting blades are essentially shown angled in respect of this holding portion 9. The engagement portion 2 is basically shaped as is shown in FIG. 1a with the difference that the cutting blades 4 have forwardly (in a rotation direction) rounded arch-shaped configuration. Further, the distal ends of the blades are rounded. This results in that the cutting blades are somewhat wider in their distal portions 9 for good effect also in case of slight downward movement of the engagement portion 2 into the ground to be repaired.

When using the tool in FIGS. 3a-c, the engagement portion is brought down in the ground during simultaneous clockwise rotation to an extent that corresponds to the angling of the rear edge in the turning direction, which typically corresponds to ⅙ turn at complete pressing down of the engagement portion. Thereafter the user turns the tool a further minor portion of a turn, e.g. ¼ turns, with the engagement portion being pressed down at the same level.

Since divots on golf greens are of varying sizes and depths, depending i.a. on height of green shot, the ground hardness and moist conditions of the green, the down-pressing and turning of the engagement portion is adapted to prevailing conditions. By using a golf green repair tool according to the invention it is ensured that the grass adjacent to the divot will quickly re-grow and restore the damage. Through the cutting action in the root level on the grass, the forming of root shoots will be ensured which gives good re-establishment of grass growth in the divot.

11 indicates a rounded levelling surface portion being positioned close to the proximal ends of the cutting blades and between these and extending inwardly towards the axis of rotation. It ensures that by turning the tool, inwardly moved and uplifted material will be leveled and to a certain extent be flattened to the level of the ground surface. At the upper side, directed towards the holding portion 9, of the structure forming the levelling surface portion 11 there is formed a pressing portion. This is thus positioned at the reverse side of the levelling surface portion 11, as this can be seen in FIG. 3c. A pressing portion helps the user to get a rest for his thumb or other fingers during pressing down of the tool into the ground.

The invention can be modified within the scope of the claims. It is preferred that the number of cutting blades is two but it is not excluded that in certain applications a greater number of cutting blades are used.

The cutting blades 4 have a sharp cutting front edge 7 that can extend linearly or in curve form along its extension from its proximal end to its distal end. The blades are shown in the figures having slightly outwardly arched or curved outwards directed sides.

Most simple, the blades are substantially planar and have an even thickness except at the region of the front cutting edge, where the blades are ground-off at the outside front so as to form the sharp edges. When the tool is an uprooter, a normal, general shape of the blades, is an essentially triangular side shape, as seen from a direction perpendicular to the axis of rotation.

As is indicated above, the ratio between the distance between points positioned on the front edge 7 and the axis of rotation 3 and the distance between point position on the rear edge 8 and the axis of rotation 3 is from about 5/4 to about 2/1 as seen in a section centrally between the proximal and distal ends of the cutting blades. As seen in more distal sections, the ratio is normally less, whereas as seen in more proximal sections of the blades, the ratio is normally higher because of the edges narrowing in the direction of the distal end of the blades. This is clear by looking at FIG. 1b.

In one example of a simple to produce engagement portion 2 of a tool according to the invention, substantially corresponding to the tools shown in FIGS. 1a, b and 2a, b, c, the engagement portion 2 is produced from an elongated strip of plate metal having parallel sides and edges and a chosen width. The two blades 4 are each bent more than 90° along an associated bending line so as to form the inward angle β (see FIG. 2c).

The two bending lines are parallel with each other and it is to be noted that they form an acute angle with a line following the length extension of the strip of plate metal such that the original side edges of the strip of plate metal form the rear edges of the engagement portion. Hereby the blades are bent such that a distal portion of each rear edge 8 is positioned in front of, as seen in the turning direction v, and essentially at the same distance from the axis of rotation 3 as a proximal portion thereof.

The front edges are formed by sharpening as is described above. Subsequently the engagement portion is hardened if required. The engagement portion is thereupon fastened to a holding portion through for example soldering, welding, screw fastening, riveting or the like.

It is within the scope of the invention that, at their distal ends, the points of the blades 4 can be cut off or ground-off so as to have them slightly less pointed. In that case it might be that the distal portions of the rear edges are not exactly at the same distance from the axis of rotation 3 as the proximal portions thereof.

Even if an ejector for an uprooted root, held between the blades after a completed uprooting process, is normally not necessary, it is not excluded that a tool according to the invention in the form of an uprooter is provided with such a device. Most simple, such an ejector can have an ejector plate between the blades being maneuverable up and down by means of a knob above the transverse handle 9 (see FIG. 2a). The knob can be connected to the ejector plate over a thin rod being arranged inside the tubular distance portion 10. The arrangement can also be spring loaded into a normal, inactive position of the ejector. Other types of ejectors and ejector maneuvering arrangements are also possible to include in the tool.

The invention is also applicable for taking up tree stumps from the ground. In that case, the dimensions are increased so as to adapt to the sizes of the stumps in question. It might be the case, for larger stumps and greater dimensions, that the tool has to be power driven.

The invention claimed is:

1. Tool for engagement in the ground including a holding portion for maneuvering an engagement portion during turning of the tool around an axis of rotation extending through the holding portion and the engagement portion, wherein the engagement portion has a plurality of cutting blades extending in directions from the holding portion and being distributed around the axis of rotation for pressing down into and engagement with the ground, said cutting blades each having a proximal end closes closest to the holding portion and a distal free end, at the greatest distance from the holding portion, wherein the cutting blades have a respective front edge, as seen in a turning direction when turning around the axis of rotation, for cutting action against the ground and a respective rear edge, wherein points on the front edges are positioned at a greater distance from the axis of rotation than points on the rear edges, and wherein the cutting blades are angled such that a distal portion of each rear edge is positioned in front of, as seen in the turning direction, and essentially at the same distance from the axis of rotation as a proximal portion thereof.

2. Tool according to claim 1, wherein each front edge has an even forwardly extending curve.

3. Tool according to claim 1, wherein the cutting blades have an arch-shaped cross-section.

4. Tool according to claim 1, wherein the engagement portion in association with the proximal ends of the cutting blades has a leveling surface portion which is rounded and positioned there between and extending inwardly towards the axis of rotation.

5. Tool according to claim 1, wherein the ratio between the distance between points positioned on the front edge and the axis of rotation and the distance between point position on the rear edge and the axis of rotation is from about 5/4 to about 2/1 as seen in a section centrally between the proximal and distal ends of the cutting blades.

6. Tool according to claim 1, wherein it is a tool for the repair of divots on golf greens.

7. Tool according to claim 6, wherein the distance between the distal end of a cutting blade and the axis of rotation is about 6-11 mm and that the length of the cutting blades is about 16-30 mm.

8. Tool according to claim 6, wherein the cutting blades are angled between about 5° and 15° in respect of the axis of rotation.

9. Tool according to claim 6, wherein the tool is essentially plate-shaped with angled cutting blades.

10. Tool according to claim 1, wherein it is a tool for extracting weed roots.

11. Tool according to claim 10, wherein the distance between the distal end of a cutting blade and the axis of rotation is about 6-30 mm and that the length of the cutting blade is about 50-200 mm.

12. Tool according to claim 1, wherein the tool comprises a holding portion in the form of a handle which is transverse to the axis of rotation.

13. Tool according to claim 10, wherein an intermediate portion connects to the holding portion, which passes over to the engagement portion.

14. Tool according to claim 10, wherein the cutting blades are angled between 1° and 12° in respect of the axis of rotation.

\* \* \* \* \*

UNITED STATES PATENT AND TRADEMARK OFFICE
CERTIFICATE OF CORRECTION

PATENT NO.        : 8,714,277 B2
APPLICATION NO. : 13/255604
DATED             : May 6, 2014
INVENTOR(S)       : Hans Lindh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 7 days.

Signed and Sealed this
Twenty-ninth Day of September, 2015

Michelle K. Lee
*Director of the United States Patent and Trademark Office*